G. E. DOUGHTY.
MANIFOLDING SALES BOOK.
APPLICATION FILED MAR. 8, 1916.

1,204,384.

Patented Nov. 7, 1916.

WITNESSES
C. F. Volk
M. A. Meyer.

INVENTOR
G. E. Doughty
BY
Dull, Warfield & Dull
ATTORNEYS

UNITED STATES PATENT OFFICE.

GEORGE E. DOUGHTY, OF NEW YORK, N. Y., ASSIGNOR TO AMERICAN SALES BOOK COMPANY, LIMITED, OF TORONTO, ONTARIO, CANADA, A CORPORATION OF ONTARIO, CANADA.

MANIFOLDING SALES-BOOK.

1,204,384.  Specification of Letters Patent.  Patented Nov. 7, 1916.

Application filed March 8, 1916. Serial No. 82,791.

*To all whom it may concern:*

Be it known that I, GEORGE E. DOUGHTY, a citizen of the United States, residing at New York, in the county of New York and State of New York, have invented certain new and useful Improvements in Manifolding Sales-Books, of which the following is a full, clear, and exact description, such as will enable others skilled in the art to which it appertains to make and use the same.

This invention relates to manifolding devices, and with respect to its more specific features, to manifolding salesbooks.

One of the objects of the invention is the provision of a practical salesbook wherewith a multiplicity of records may be made at one writing.

Another object of the invention is to provide a simple and convenient form of salesbook in which quadruplex records may be made quickly and with but little liability of the leaves being out of registry during inscription.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
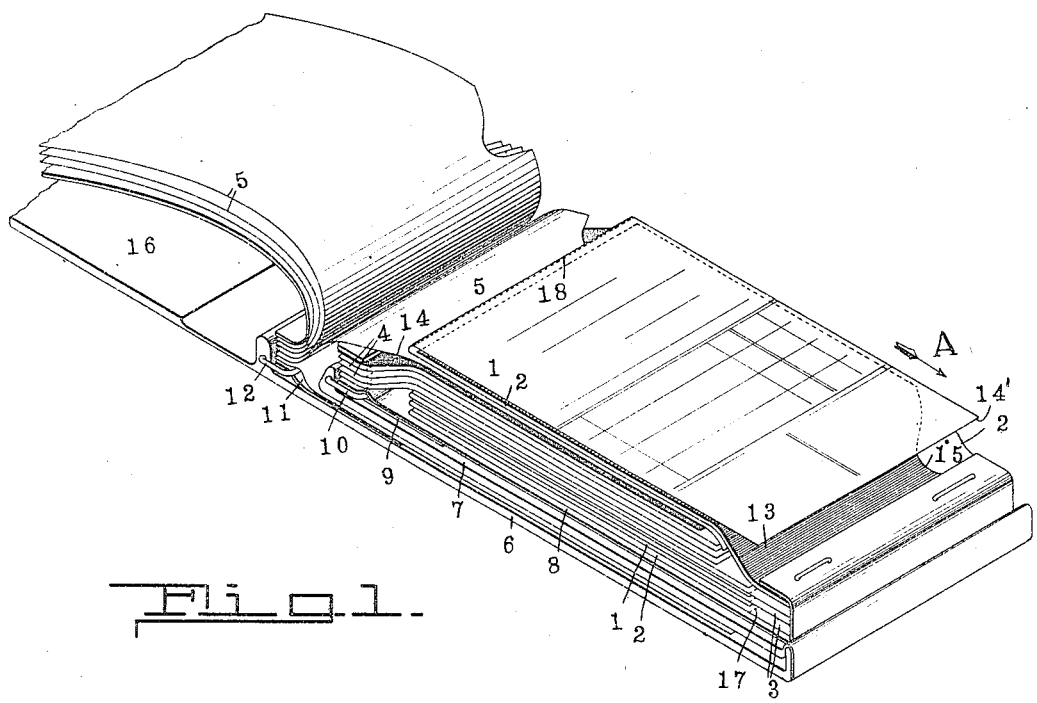
Figure 2:
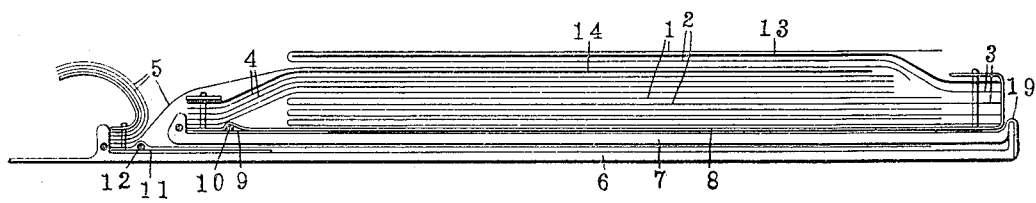

In the accompanying drawings forming part of this specification, and wherein similar reference characters refer to similar parts throughout the several views, Figure 1 is a perspective view of one embodiment of the invention; and Fig. 2 is an elevation of Fig. 1, partly in section.

In the embodiment of the invention illustrated three pads are employed and therewith it is possible to make four records at one writing. One of the pads is composed of double leaves 1 and 2 formed by folding a sheet on itself, one-half of the leaves of this pad being provided with stubs 3 bound together, and the other half folded in between. Another of the pads is composed of single leaves 4, and the third pad is preferably composed of tissue leaves 5, although it may be composed of opaque leaves similar in quality to the leaves 1, 2 and 4. The three pads just mentioned are adapted to lie in superposed relation one upon the other and so that, in the manipulation of the leaves thereof, the movement of the leaves will be in the same general plane, as, for instance, in a vertical plane substantially toward and from the operator, in the embodiment illustrated. To hold them in position and permit of such manipulation and enable the leaves of the respective pads to be superposed in a predetermined order for inscription, the several pads are connected to a binder. In the present embodiment the binder comprises three leaves 6, 7 and 8, superposed on each other, the intermediate leaf 7, at opposite ends thereof, being flexibly connected, as by parallel hinges, to the upper and under leaves of the binder. This flexible connection may be attained by the mere folding or bending of a suitable piece of material so as to provide the three superposed binder leaves, but preferably this binder is composed of a stiff lowermost leaf, which may be of metal covered with cloth or paper, the intermediate leaf being also of a similar material and connected to the lowermost leaf by an extension of the cloth referred to. The uppermost leaf of the binder is preferably a Manila sheet, which is connected to the intermediate leaf in some appropriate manner, preferably by means of a tongue 9 engaging a bail 10 hinged to the intermediate leaf. The intermediate stiff leaf 7 of the binder carries the pad of double leaves and the pad of single leaves, the stub portion of each of these pads being connected to the Manila sheet 8, at opposite ends of the latter, so that the leaves of one of these pads extend from its stub portion in a direction opposite to that in which the leaves of the other pad extend from its stub portion. The leaves of these pads are also made of sufficient length so that, when connected to the Manila sheet, they may be superposed upon each other. The remaining pad, the one composed of tissue leaves, is connected to the underlying stiff leaf of the binder, as by means of a tongue 11 engaging a bail 12 hinged to the under stiff leaf, and the leaves of the tissue pad are of sufficient length to be superposed upon the leaves of the other two pads.

Transfer material is employed to cause impressions made in the usual manner upon an outermost sheet to be copied upon underlying sheets. It is within the spirit of this invention to employ a carbon coating for the leaves of one or more of the pads hereinbefore referred to, when feasible, but it is preferred to employ a single faced carbon sheet 13 fastened to the stub end of the double leaf pad and a double faced carbon sheet 14 fastened to the stub end of the single sheet pad 4, the single faced sheet being adapted to be disposed between the plies of the double leaves with its carbon face down, as these latter leaves successively present themselves, and the double faced sheet lying upon the upper face of the pad of single leaves and accommodating itself to the successive underlying leaves of this pad as the inscribed leaves are removed.

In order that the leaves of the pads may be easily manipulated; to avoid rumpling them, and also to avoid increasing the thickness of the book unduly at any one point, the ends of the pads are preferably disposed one beyond another, as for instance the stub ends of the tissue pad and the single leaf pad are placed at different distances from the stub end of the double leaf pad, the stub end of the tissue pad being the more remote. Also, the stub end of the double leaf pad extends beyond the free end of the single leaf pad, so that the free end 14' of the uppermost leaf of the double leaf pad extends beyond the free end of the single leaf pad into position where it may be more readily grasped, the single faced carbon sheet being recessed at 15 in order to permit an underlying leaf of the double leaf pad to be easily grasped. The binder leaf to which the tissue pad is connected also extends beyond the free end of the intermediate binder leaf, as illustrated. In this wise undue thickness of the pads at either end is avoided, and at the same time the leaves of the respective pads lie more smoothly relative to each other, by reason of the gradual instead of abrupt bending otherwise consequent. The cover material of the underlying leaf of the binder may be continued beyond the end thereof to form a hinge for a stiff cover 16, which may be folded down upon the superposed pads to inclose the same and prevent injury thereto.

In the drawings the book is shown with the leaves set in position for making quadruplicate copies, the original inscription being made on the leaf 1, the second on the leaf 2, the third on the under face of the tissue leaf 5, and the fourth on the leaf 4. After inscription, the leaf 1 may be grasped at its lower end and drawn toward the operator in the direction indicated by the arrow A, which movement will cause the single faced carbon sheet to fold at its connection with the pad so as to drape over the end of the device which is adjacent the operator. The original and duplicate leaves are then torn from the pad along the weakened line 17 customarily provided at the stub end of such pad, and the original and duplicate leaves may be torn apart along a similar weakened line 18 therebetween and disposed of as may be intended. The intermediate stiff binder leaf 7 is then elevated by turning the same on its hinge connection 19 with the underlying stiff leaf 6, so as to permit the tissue leaf to fall beneath the intermediate binder leaf 7, whereupon the binder leaf 7 is permitted to drop upon the inscribed tissue leaf. The next succeeding tissue leaf is then swept onto the pad of single leaves 4 and the carbon sheet 13 may then be folded into its operative position by placing a finger or hand beneath the same, where it will come in contact only with the uncoated face of said leaf, smutting and soiling of the fingers by this leaf being thus avoided. The free end 14' of the underlying original leaf may then be grasped where it presents itself opposite the recess 15, and upon drawing this leaf toward the operator, it and the leaf 2 will be drawn from beneath the pad of single leaves 4, whereupon they may be permitted to fall upon the tissue leaf which has just been placed in operative position. Or, after the tissue leaf has been placed in operative position and while the single faced carbon sheet is lying over the end of the device adjacent the operator, the free end of the original leaf 1 may be grasped by one hand, pulled from beneath the pad of single leaves, and permitted to drop upon the tissue leaf already in position, the single faced carbon sheet being folded into position between the original and duplicate leaves by the other hand as the original and duplicate leaves are permitted to fall into operative position.

The normal manner of operating the book is to dispose the book with the several hinges extending across the front of the operator, so that the leaves will move in lines toward and from the operator. The book may be operated without a rest, the cover being held in the left hand and the manipulation being done by the right hand. If the book is placed upon a rest and the leaves manipulated by the assistance of both hands, its operation is even more rapid and convenient.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. A manifolding salesbook comprising, in combination, a binder, three pads including a pad of folded leaves, said pads being connected at one end of each to the binder so that the leaves of the folded-leaf pad extend from their point of connection toward the point of connection of the leaves of the other pads, the length of the leaves of said pad being such as to permit their superposition, whereby a folded leaf may be superposed with a leaf of each of said other pads, and means whereby an impression made on the uppermost of said four superposed leaves will be copied on the three underlying leaves thereof.

2. A manifolding salesbook comprising, in combination, a binder, three pads including a pad of folded leaves, said pads being connected at one end of each to the binder so that the leaves of the folded-leaf pad extend from their point of connection toward the point of connection of the leaves of the other pads, the length of the leaves of said pads being such as to permit their superposition, whereby a folded leaf may be superposed with a leaf of each of said other pads, a transfer sheet adapted to lie between the plies of said folded leaves, and a double faced transfer sheet adapted to lie between the said superposed leaves of said other pads.

3. A manifolding salesbook comprising, in combination, a binder, three pads including a pad of folded leaves, said pads being connected at one end of each to the binder so that the leaves of the folded-leaf pad extend from their point of connection toward the point of connection of the leaves of the other pads, the points of connection between said respective other pads and said binder being different distances from the point of connection of the folded-leaf pad, the length of the leaves of said pads being such as to permit their superposition, whereby a folded leaf may be superposed with a leaf of each of said other pads, and means whereby an impression made on the uppermost of said four superposed leaves will be copied on the three underlying leaves thereof.

4. A manifolding salesbook comprising, in combination, a binder, three pads including a pad of folded leaves and a pad of tissue leaves, said pads being connected at one end of each to the binder so that the leaves of the folded-leaf pad extend from their point of connection toward the point of connection of the leaves of the other pads, the points of connection between said respective other pads and said binder being different distances from the point of connection of the folded-leaf pad, the point of connection of the tissue leaf pad being more remote, the length of the leaves of said pads being such as to permit their superposition, whereby a folded leaf may be superposed with a leaf of each of said other pads, and means whereby an impression made on the uppermost of said four superposed leaves will be copied on the three underlying leaves thereof.

5. A manifolding salesbook comprising, in combination, a binder, three pads including a pad of folded leaves and a pad of tissue leaves, said pads being connected at one end of each to the binder so that the leaves of the folded-leaf pad extend from their point of connection toward the points of connection of the leaves of the other pads, the points of connection between said respective other pads and said binder being different distances from the point of connection of the folded-leaf pad, the point of connection of the tissue leaf pad being more remote, and both of said points of connection being beyond the folded ends of the folded-leaf pad, the length of the leaves of said pads being such as to permit their superposition, whereby a folded leaf may be superposed with a leaf of each of said other pads, and means whereby an impression made on the uppermost of said four superposed leaves will be copied on the three underlying leaves thereof.

6. A manifolding salesbook comprising, in combination, a binder, three pads including a pad of folded leaves, said pads being connected at one end of each to the binder so that the leaves of the folded-leaf pad extend from their point of connection toward the point of connection of the leaves of the other pads, the length of the leaves of said pads being such as to permit their superposition, whereby a folded leaf may be superposed with a leaf of each of said other pads, and means whereby an impression made on the uppermost of said four superposed leaves will be copied on the three underlying leaves thereof, said binder comprising superposed leaves hinged together, to the uppermost one of which two of said pads are connected.

7. A manifolding salesbook comprising, in combination, a binder, three pads including a pad of folded leaves, said pads being connected at one end of each to the binder so that the leaves of the folded-leaf pad extend from their point of connection toward the point of connection of the leaves of the other pads, the length of the leaves of said pads being such as to permit their superposition, whereby a folded leaf may be superposed with a leaf of each of said other pads, and means whereby an impression made on the uppermost of said four superposed leaves will be copied on the three underlying leaves thereof, said binder comprising superposed leaves hinged together along parallel lines, to the uppermost one of which leaves two of said pads are connected, the third pad being connected to the lower leaf of the binder beyond the end of the upper leaf.

8. A manifolding salesbook comprising, in combination, a binder, three pads including a pad of folded leaves, said pads being connected at one end of each to the binder so that the leaves of the folded-leaf pad extend from their point of connection toward the point of connection of the leaves of the other pads, the length of the leaves of said pads being such as to permit their superposition, whereby a folded leaf may be superposed with a leaf of each of said other pads, and means whereby an impression made on the uppermost of said four superposed leaves will be copied on the three underlying leaves thereof, said binder comprising three superposed leaves, the intermediate leaf being at opposite ends thereof hinged to the upper and lower leaves, respectively, two of said pads being connected to the upper leaf of said binder.

9. A manifolding salesbook comprising, in combination, a binder, three pads including a pad of folded leaves, said pads being connected at one end of each to the binder so that the leaves of the folded-leaf pad extend from their point of connection toward the point of connection of the leaves of the other pads, the length of the leaves of said pads being such as to permit their superposition, whereby a folded leaf may be superposed with a leaf of each of said other pads, and means whereby an impression made on the uppermost of said four superposed leaves will be copied on the three underlying leaves thereof, said binder comprising three superposed leaves, the intermediate leaf being, at opposite ends thereof, hinged to the upper and lower leaves, respectively, two of said pads being connected to the upper leaf of said binder, and the third pad to the lower leaf of the binder.

10. A manifolding salesbook comprising, in combination, a pad of double leaves, one-half of which are provided with stubs bound together and the other half folded in between, a pad of single leaves having stubs bound together, a pad of tissue leaves, and a binder comprising superposed leaves hinged together, along parallel lines, the end of one binder-leaf extending beyond the end of the other, the pad of single leaves and the double leaf pad being carried by the upper leaf of the said binder leaves and arranged so that the leaves of one extend from its stub in an opposite direction from the leaves of the other, the stub ends of each of these latter pads being disposed one beyond the free end of the other, the pad of tissue leaves being connected to the lower leaf of the said binder leaves at a point beyond the free end of the said upper binder leaf.

11. A manifolding salesbook comprising, in combination, a pad of double leaves, one-half of which are provided with stubs bound together and the other half folded in between, a pad of single leaves having stubs bound together, a pad of tissue leaves, and a binder comprising superposed leaves hinged together along parallel lines, the end of one binder-leaf extending beyond the end of the other, the pad of single leaves and the double leaf pad being carried by the upper leaf of the binder and arranged so that the leaves of one extend from its stub in an opposite direction from the leaves of the other, the stub end of each of the latter pads being disposed, one beyond the free end of the other, the pad of tissue leaves being connected to the lower leaf of the binder at a point beyond the free end of the other binder leaf, said pads being removably joined to the said respective binder portions.

12. A manifolding salesbook comprising, in combination, a pad of double leaves, one-half of which are provided with stubs bound together and the other half folded in between, a pad of single leaves having stubs bound together, a pad of tissue leaves, a binder comprising superposed leaves hinged together, the end of one binder-leaf extending beyond the end of the other, the pad of single leaves and the double leaf pad being carried by the upper leaf of the said binder leaves and arranged so that the leaves of one extend from its stub in an opposite direction from the leaves of the other, the stub end of each of these latter pads being disposed, one beyond the free end of the other, the pad of tissue leaves being connected to the lower leaf of the said binder leaves at a point beyond the free end of the said upper binder leaf, a single face transfer sheet carried by the double leaf pad, and a double face transfer sheet carried by the single leaf pad.

13. A manifolding salesbook comprising, in combination, a pad of double leaves, one-half of which are provided with stubs bound together and the other half folded in between, a pad of single leaves having stubs bound together, a pad of tissue leaves, a binder comprising three superposed leaves hinged together along parallel lines, the end of one binder-leaf extending beyond the end of the other, the pad of single leaves and the double leaf pad being carried by the upper leaf of the binder and arranged so that the leaves of one extend from its stub in an opposite direction from the leaves of the other, the stub end of each of these latter pads being disposed, one beyond the free end of the other, the pad of tissue leaves being connected to the lower leaf of the binder at a point beyond the free end of the upper binder leaf, a single face transfer sheet carried by the double leaf pad, and a double face transfer sheet carried by the single leaf pad, the single face transfer sheet having a recess adapted to expose the free end of the uppermost double leaf.

In testimony whereof I affix my signature, in the presence of two witnesses.

GEORGE E. DOUGHTY.

Witnesses:
M. A. MEYER,
C. J. KULBERG.